April 10, 1956  E. H. MONKLEY  2,741,102
AUTOMATIC CONSTANT TENSION CONTROL
Filed Dec. 11, 1952  3 Sheets-Sheet 1

INVENTOR.
EDWARD H. MONKLEY
BY
Charles R. Fay, atty.

INVENTOR.
EDWARD H. MONKLEY

April 10, 1956     E. H. MONKLEY     2,741,102
AUTOMATIC CONSTANT TENSION CONTROL Filed Dec. 11, 1952     3 Sheets-Sheet 3

INVENTOR.
EDWARD H. MONKLEY

United States Patent Office 2,741,102
Patented Apr. 10, 1956

2,741,102

AUTOMATIC CONSTANT TENSION CONTROL

Edward H. Monkley, Worcester, Mass.

Application December 11, 1952, Serial No. 325,495

10 Claims. (Cl. 64—30)

This invention relates to an automatic constant tension control having means for automatically increasing or decreasing the output torque to the rotating roll for any material which is being wound or unwound, as the diameter of the roll changes, but the present invention has for its principal object the provision of means for so changing the output torque to the roll according to the rotation of the shaft rotating the roll and predetermined as to the amount of change of torque by reason of the particular material being processed and not merely in accordance with the changing diameter of the roll.

It has been proposed in the past to change the output torque according to the changing diameter of the roll being processed, but this is inaccurate as to pressure exerted on the material since the actual diameter does not change in some instances as might be expected upon merely winding the material on the roll. In some cases where the material being wound has a degree of elasticity, the roll itself will become flattened or relatively diminished in the center and enlarged at the ends to put elasticity of the material to be wound, which material may be natural or synthetic. In this case, the torque will not increase or decrease according to the amount of material put on to or taken from the roll, and it is one of the principal objects of the present invention to provide a mechanism that does not depend upon the diameter of the roll but instead depends upon the rotation of the roll and the particular material being processed.

Other objects of the invention include the provision of a device according to the present invention which is useful for the tension control for unwinding or rewinding paper, foil, plastics, textiles and for converting, printing, embossing, calenders, extruders, corrugating machines, and in many other relations wherein the machine is provided with means for pre-setting the same according to the material being processed, so that change in torque will be constant at all times during the process; and the provision of a device as above stated including a roll winding or output shaft driven through a friction clutch, the pressure upon which is constantly changed by means of a head which is moved according to the roll rotation, the head moving against a lever type of cam which is adjustable and pre-set so as to vary the rate of change of torque for different materials; and the provision of a machine as above described including a dial for the cam, a pressure indicator, and a replaceable chart for each material, the characteristics for winding of said material being placed upon the chart, together with the dial setting for the particular material, so that the operator of the machine is enabled merely to glance at his chart, and set the dial and pressure indicator to the correct positions for a winding or unwinding of the web, so that the increase or decrease of torque is exactly constant and therefore the control of the process made with utmost efficiency, regardless of the kind of material being processed.

Other objects and advantages of the invention will appear hereinafter.

Reference is to be had to the accompanying drawings, in which

Figure 2:
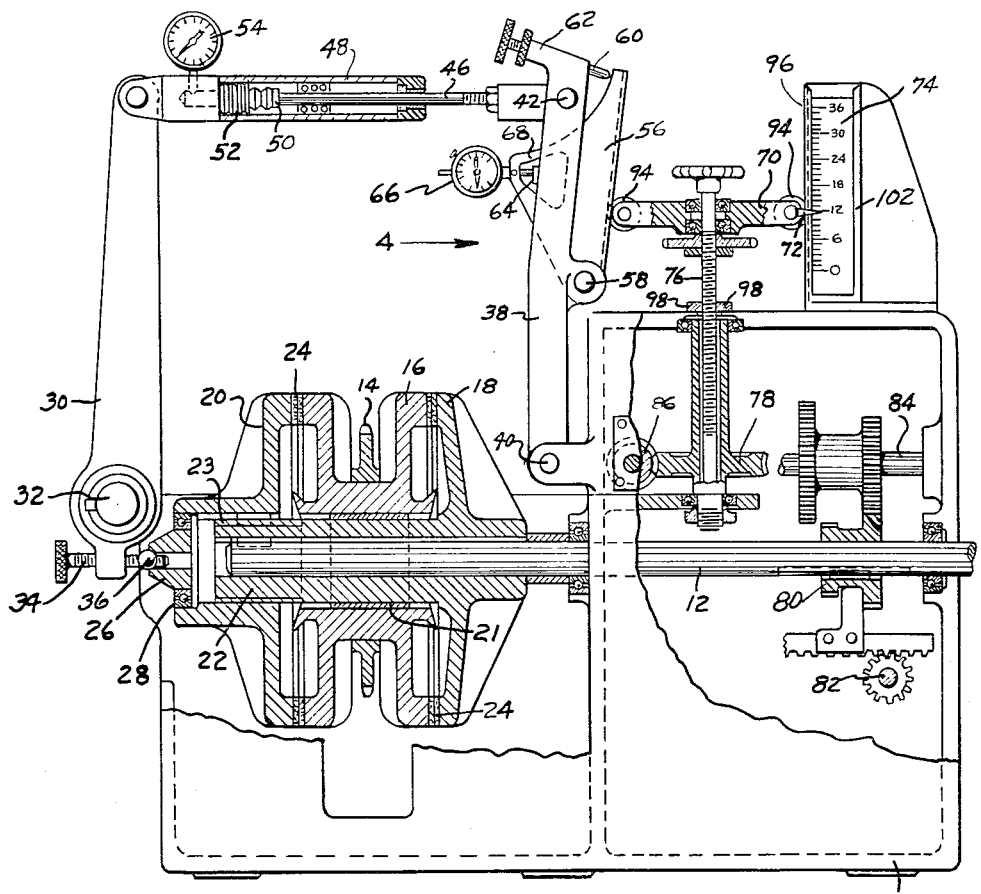
Fig. 2 is a view in elevation, partly in section, of the same machine.

The mechanism of the present invention may be conveniently housed in a base or housing 10 which may be of any usual or convenient shape or size to house the parts of the mechanism to be described. The output shaft 12 extends at one end of the housing, and this shaft may be coupled to a roll (not shown) for unwinding or rewinding. Shaft 12 is driven by means of a sprocket 14 deriving its power from an existing processing machine (not shown) or from a motor. The sprocket 14 drives one element 16 of a double faced friction clutch, the same having complementary clutch parts 18 and 20, one at either side thereof, and these clutch parts, best seen in Fig. 2, are splined to the output shaft through a sleeve 22 and thereby drive the same. The clutch part 16 rotates on the sleeve 22 and bearings 21 of any kind may be inserted therebetween. The clutch part 18 is mounted on this sleeve and so is clutch part 20, the latter sliding on chromium slide bearing 23 of annular form. These clutch parts rotate together and are provided with friction surfaces 24 which ride on equivalent friction surfaces on the two faces of the clutch part 16.

Figure 1:
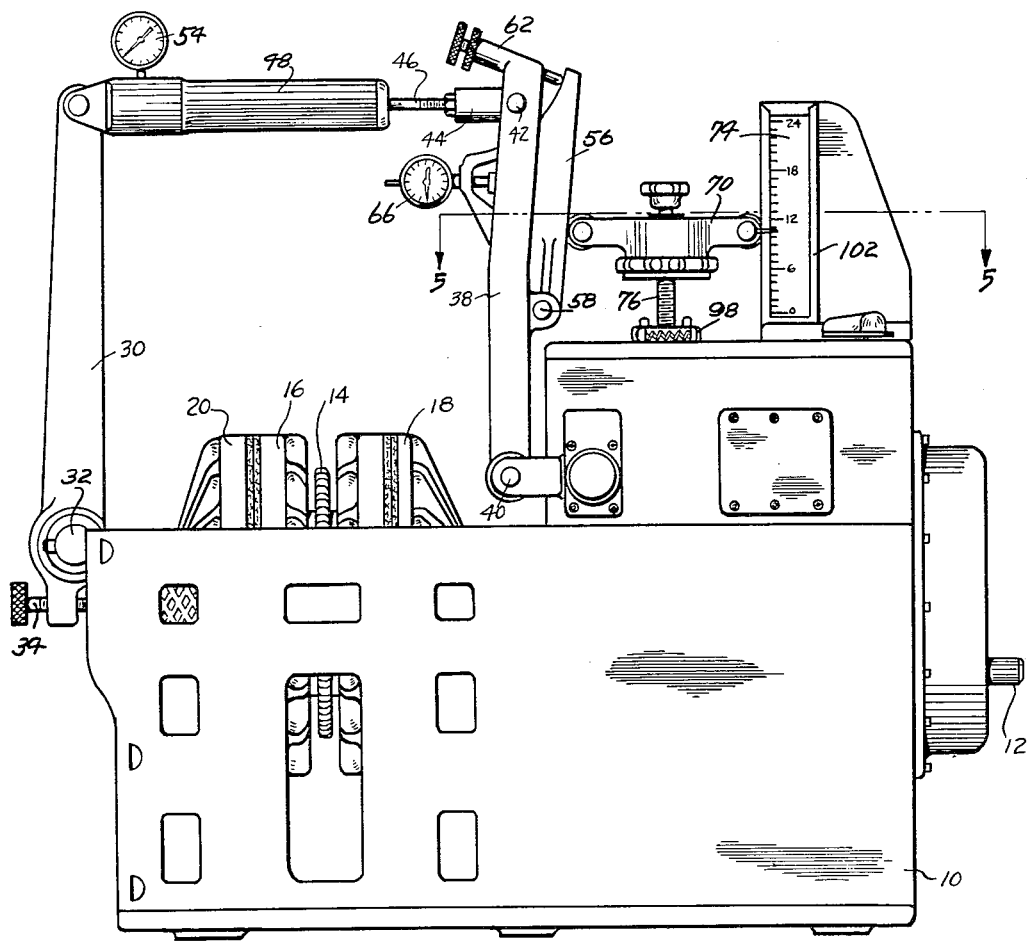
Fig. 1 is a view in elevation of a machine according to the present invention.

The clutch part 18 does not necessarily move longitudinally of shaft 12, but clutch part 20 is so movable and means is provided to exert a pressure towards the right in Figs. 1 and 2, which pressure is impressed upon the clutch part 20 at the center thereof and thus with varying force exerts a pressure upon clutch part 16, which pressure is transmitted to clutch part 18. This pressure is variable and thus varies the torque imparted to shaft 12.

A hub 26 is fixed against axial movement relative to clutch part 20 and these parts are provided with a rotary bearing therebetween at 28. The hub and clutch part 20 move axially together under influence of the lever 30 pivoted at 32 to the housing 10. An adjustable screw rod or the like 34 takes into a nut 36 on the hub and is capable of adjusting the original clutch pressure manually.

Figure 4:
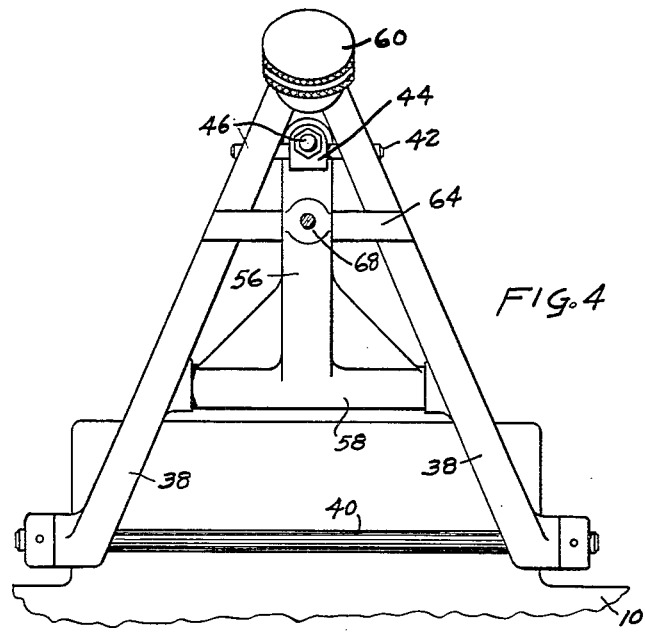
Fig. 4 is a view in elevation, looking in the direction of arrow 4 in Fig. 2, parts being in section.
Figure 5:
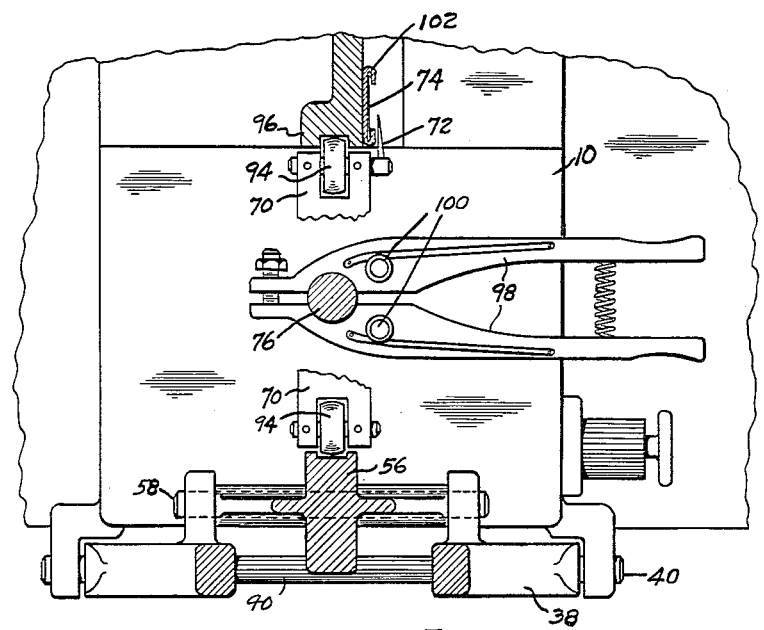
Fig. 5 is a sectional view on an enlarged scale, taken on the line 5—5 in Fig. 1, parts being omitted for clarity of illustration.

The lever 30 is swingable in a vertical plane and receives its motion in a counter-clockwise direction in Figs. 1 and 2 to increase the pressure on the clutch, from a swinging lever 38 pivoted at 40 to the machine frame or housing 10. The lever 38 is in the form of a triangle, i. e., it is an A frame, see Fig. 4. Adjacent its apex at its free end, it is provided with a rod 42 on which is mounted a ferrule 44 into which is adjustably threaded a rod 46. This threaded rod extends into an elongated housing 48 and has at its opposite end a plunger 50 acting on a bellows 52. As rod 46 moves to the left, the pressure in the bellows increases and is registered on a dial 54. At the same time of course the arm 30 is moved counter-clockwise and the free increase on the clutch is therefore registered on the dial 54.

The lever 38 is provided with a variable lever-type of cam indicated at 56. This cam is pivoted to the A frame 38 at 58 and may be pre-set as to its inclination by means of a screw-threaded rod 60 located in a barrel 62 at the top of the A frame.

A strap 64 extends across the two legs of the A frame and mounted on this strap there is a dial indicator 66. The cam 56 is provided with a rearward extension 68 and as cam 56 is moved in a counter-clockwise direction, it causes the dial 66 to increase in reading. By this means, the operator is always aware of the position of the cam and he is also enabled to quickly and accurately set the cam 56 to the inclination desired at the start of a run by referring to the reading on the dial.

The A frame 38 receives its pivotal motion through cam 56 from a head 70. This head starts from a lowermost position and has a pointer 72 which registers with readings on a data card 74. This card is removable and it is intended that the data for different materials to be processed shall be inscribed on this card, i. e., the angle of inclination of the cam that is necessary for the particular material, etc.

Figure 3:
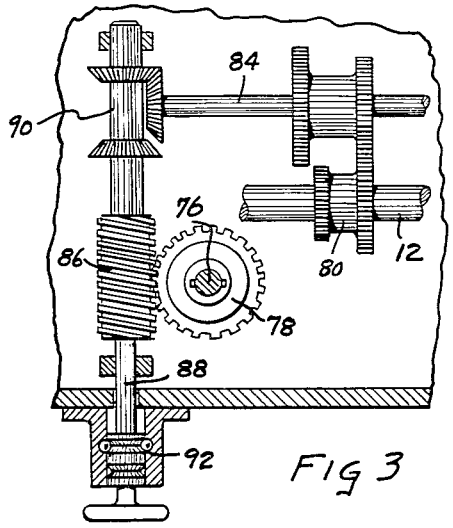
Fig. 3 is a detail view of the head driving means.

Head 70 is provided with a screw-rod 76 which is rotated and caused to be translated upwardly by means of a wheel 78. As wheel 78 rotates, the rod 76, being in mesh with a fixed nut, is caused to move bodily upwardly. The wheel 78 is rotated by the shaft 12 through suitable reverse and change speed gearing shown in Fig. 3, including a double spur gear 80 splined on the shaft 12 and translatable thereon by means of a rack and pinion arrangement 82 so as to change the relative speeds between shaft 12 and shaft 84 which is adapted to drive the wheel through a worm indicated at 86. The worm 86 is mounted on a shaft 88 and the shaft 84 drives the same through a reverse gearing 90. The shaft 88 is capable of two positions as indicated by the spring band and double notch 92, see Fig. 3, so that the head may be reversed if desired.

The head 70 is provided also with a hand wheel and rollers at 94 for riding on the cam 56 and upon a fixed track 96 opposite therefrom, so that as the head rises, it of course moves cam 56 and A frame 38 in a counterclockwise direction. This movement is determined by the original inclination of the cam, so that as the head rises, the increase in pressure on the clutch will be constantly changed, but the original inclination of the cam defines the change in pressure on the clutch.

In order to return the head to zero position, there are provided a pair of arms 98 which are spring-pressed toward each other upon rivots 100 and provide screw-threaded jaws which engage the threaded rod 76. By separating these jaws, the head is released and may descend freely, but when the jaws are engaged, they form the fixed nut referred to above by which means the screwthread rod 76 is translated during rotation thereof.

When it is desired to wind or unwind a roll of a particular material, the data card 74 for this particular material is inserted as in a slideway or the like 102. This card indicates the dial reading at 66 and the operator then adjusts the cam 56 until the dial 66 conforms to the reading required, and the machine is ready to operate to perform its winding function. If a new material is used and the characteristics are not known, then the same are determined empirically, and the characteristics are then marked upon the card for future reference.

As the head rises, it gradually causes the A frame lever 38 to move in a counter-clockwise direction, thus in turn causing rod 46 to be moved to the left, increasing the pressure in the bellows 56 and the reading on the pressure gauge 54 and also at the same time moving lever 30 in a counter-clockwise direction to increase the pressure toward the right on the clutch part, so that the torque is gradually and constantly increased during the rotation of the shaft 12. It will be seen that this increase of torque is constant and at the same time it is proportionate to the amount of material being wound upon the roll, and does not depend upon temporary roll diameter changes which as explained above cause inconsistencies and inaccuracies in the change of torque control in prior art machines. It is to be particularly noted that as a highly elastic material is wound, it will assume a dumb-bell shaped conformation on the roll, but when the winding has been completed, the elasticity will tend to return to its normal state, thus increasing the diameter of the roll at the center thereof, after the winding has been completed. At the same time of course the ends of the roll decrease in diameter from their unnaturally increased diameter, so that it is clear that the exact diameter of the roll is not accurate as a basis to determine change in torque on the roll shaft.

Having thus described my invention and the advantages thereof, I do not wish to be limited to the details herein disclosed, otherwise than as set forth in the claims, but what I claim is:

1. Automatic constant control mechanism including a base, a shaft therein, a variable pressure slip clutch for driving the shaft, means to vary the pressure on the slip clutch, said means comprising a movable element, means to move the element according to the shaft rotation, a cam member moved by said element, means to adjust the cam member with relation to the path of the movable element to vary the degree of motion of the cam member under influence of the element, and means associated with the cam member to apply pressure to the variable pressure slip clutch, said pressure applying means varying the pressure according to the position of the cam member.

2. The automatic constant control of claim 1 wherein the pressure applying means comprises a linkage, one link of which includes a force indicating device.

3. The control of claim 1 including a track for the element and a removable data card on a portion of the track, the card showing the relative degree of motion of the element, and the degree of adjustment of the cam member.

4. Automatic constant tension control mechanism comprising a shaft, a variable pressure slip clutch driving the same, and means to vary the pressure on the clutch, said means comprising a movable element, means on the shaft to move the element as the shaft rotates, a movable member, a cam on the member, means to adjust the cam on the member, the movable element riding on the cam and gradually thereby moving the movable member, and a linkage between the latter and the slip clutch to vary the pressure on the clutch as the movable member is moved under influence of the movable element.

5. The automatic constant control mechanism of claim 4 including a dial on the movable member and a connection between the cam and dial to cause the adjustment of the cam to be indicated on the dial.

6. The automatic constant control mechanism of claim 4 including a screw rod to move the movable element, connections from the shaft to rotate the rod, a multi-part fixed nut meshed with the rod, means holding the parts of the nut in meshed relation with the screw rod, and handles on the nut parts for separating the nut parts to free the rod.

7. Automatic control mechanism comprising an output shaft, a friction slip clutch to drive the output shaft, a movable clutch part to vary the degree of friction and hence the torque on the shaft, a head, means to move the head, means on the shaft to operate said head moving means, a pressure lever, a cam lever on the pressure lever, means to adjust the relative inclination between said levers, the cam lever being in the path of the head and inclining into the path so that the cam and pressure levers are swung as a unit as the head moves, a rod on the pressure lever, a bellows support slidingly associated with the rod, a bellows on the support and engaged by the rod for actuation of the bellows as the levers swing to vary the pressure in the bellows, a lever connected to the bellows support, said last-named lever having an end bearing on the movable clutch part for actuation thereof to vary the shaft torque.

8. The automatic control mechanism of claim 7 including a dial to register the degree of inclination of the cam lever relative to the pressure lever to indicate the cam lever adjustment.

9. The automatic control mechanim of claim 7 including a dial to register the degree of inclination of the cam lever relative to the pressure lever to indicate the cam lever adjustment, and a removable data card associated with the head, said card including markings to show the movement of the head and for recording the cam lever adjustment.

10. Automatic control mechanism comprising a shaft, a variable friction slip clutch to drive the same, a movable head, a change speed gear connected to be driven by the shaft and effective to move the head, a reverse gear for driving the head in the opposite direction, means to release the head from driving engagement with the first-named gear for fast return of the head, a swinging lever, a pivotable cam on the lever, means to pivotally adjust the cam relative to the lever, said head engaging the cam and moving the swinging lever as the head moves under influence of the shaft, means to hold the cam in its adjusted position fixed relative to the lever, means indicating the degree of adjustment of the cam, and a linkage exerting pressure on the variable friction clutch, said linkage being connected to the swinging lever and receiving motion therefrom to vary pressure on the variable friction clutch.

References Cited in the file of this patent

UNITED STATES PATENTS

| | | |
|---|---|---|
| 2,123,744 | Ramsey | July 12, 1938 |
| 2,201,233 | Johnstone | May 21, 1940 |
| 2,252,419 | Slaughter | Aug. 12, 1941 |
| 2,401,982 | Springhorn | June 11, 1946 |
| 2,548,573 | Wampole et al. | Apr. 10, 1951 |
| 2,555,162 | Stanford | May 29, 1951 |
| 2,634,064 | Carroll | Apr. 7, 1953 |
| 2,680,573 | Monkley | June 8, 1954 |